(12) United States Patent
Loughmiller

(10) Patent No.: US 10,019,287 B1
(45) Date of Patent: Jul. 10, 2018

(54) VIRTUAL MACHINE RESOURCE DISPLAY

(71) Applicant: Scott Loughmiller, San Francisco, CA (US)

(72) Inventor: Scott Loughmiller, San Francisco, CA (US)

(73) Assignee: Scale Computing, San Mateo ( * ) Notice: Subject to any disclaimer, the term of this patent is extended or adjusted under 35 U.S.C. 154(b) by 0 days.

(21) Appl. No.: 13/841,059

(22) Filed: Mar. 15, 2013

Related U.S. Application Data

(60) Provisional application No. 61/692,660, filed on Aug. 23, 2012.

(51) Int. Cl.
*G06F 9/455* (2018.01)
*G06F 9/50* (2006.01)

(52) U.S. Cl.
CPC .................................. *G06F 9/5016* (2013.01)

(58) Field of Classification Search
None
See application file for complete search history.

(56) References Cited

U.S. PATENT DOCUMENTS

| | | | |
|---|---|---|---|
| 5,761,669 A | 6/1998 | Montague et al. | |
| 6,023,706 A | 2/2000 | Schmuck et al. | |
| 6,085,244 A | 7/2000 | Wookey | |
| 6,275,898 B1 | 8/2001 | DeKoning et al. | |
| 6,675,258 B1 | 1/2004 | Bramhall et al. | |
| 6,775,824 B1 | 8/2004 | Osborne et al. | |
| 6,961,937 B2 | 11/2005 | Avvari et al. | |
| 6,968,382 B2 | 11/2005 | McBrearty et al. | |
| 6,981,102 B2 | 12/2005 | Beardsley et al. | |
| 7,165,189 B1 | 1/2007 | Lakkapragada et al. | |
| 7,343,587 B2 | 3/2008 | Moulden et al. | |
| 7,370,101 B1 | 5/2008 | Lakkapragada et al. | |
| 7,373,438 B1 | 5/2008 | DeBergalis et al. | |
| 7,409,497 B1 | 8/2008 | Kazar et al. | |
| 7,426,729 B2 | 9/2008 | Avvari et al. | |
| 7,457,880 B1 | 11/2008 | Kim | |
| 7,574,464 B2 | 8/2009 | Hitz et al. | |
| 7,937,421 B2 | 5/2011 | Mikesell et al. | |
| 7,991,969 B1 | 8/2011 | Chatterjee et al. | |
| 8,175,863 B1 * | 5/2012 | Ostermeyer et al. | ........... 703/22 |
| 9,336,030 B1 * | 5/2016 | Marr | ................... G06F 9/45533 |
| 2002/0138559 A1 | 9/2002 | Ulrich et al. | |

(Continued)

*Primary Examiner* — Dong Kim
(74) *Attorney, Agent, or Firm* — Steven Swernofsky

(57) ABSTRACT

Presenting information to operators of a cluster of physical devices, regarding resources being used by physical machines assigned to physical devices in those clusters. An operator console, coupled to the cluster of physical devices, receives information from those physical devices with respect to use of resources by virtual machines assigned to those physical devices. Each physical device reports virtual machines assigned thereto, and an physical memory assigned to each one. The operator console presents information to the operator regarding use of resources by virtual machines, in a natural and visible way. Physical devices are disposed horizontally to indicate a selected device, and vertically to indicate allocated resources. Virtual machines are disposed with each virtual machine occupying a vertical amount proportional to allocated resources. The graphical interface allows the operator to reallocate virtual machines to physical devices, or reallocate resources to virtual machines.

20 Claims, 1 Drawing Sheet

(56) References Cited

U.S. PATENT DOCUMENTS

| | | |
|---|---|---|
| 2004/0148138 A1 | 7/2004 | Garnett et al. |
| 2005/0246612 A1 | 11/2005 | Leis et al. |
| 2005/0273659 A1 | 12/2005 | Shaw |
| 2005/0278576 A1 | 12/2005 | Hekmatpour |
| 2006/0041780 A1 | 2/2006 | Budaya et al. |
| 2006/0277206 A1* | 12/2006 | Bailey et al. ............ 707/102 |
| 2008/0021951 A1 | 1/2008 | Lurie et al. |
| 2009/0276771 A1* | 11/2009 | Nickolov et al. ......... 717/177 |
| 2009/0300173 A1* | 12/2009 | Bakman ............ G06F 11/008 709/224 |
| 2010/0115049 A1* | 5/2010 | Matsunaga ......... G06F 3/0626 709/216 |
| 2011/0161851 A1* | 6/2011 | Barber ............... G06F 9/4856 715/769 |
| 2011/0161858 A1* | 6/2011 | Barber ............ G06F 11/3433 715/772 |
| 2012/0102423 A1* | 4/2012 | Hollingsworth et al. .... 715/772 |
| 2012/0311475 A1* | 12/2012 | Wong ........................ 715/772 |
| 2013/0055092 A1* | 2/2013 | Cannon et al. ............ 715/738 |
| 2013/0067294 A1 | 3/2013 | Flynn et al. |
| 2014/0019966 A1* | 1/2014 | Neuse et al. ................ 718/1 |
| 2015/0128053 A1* | 5/2015 | Bragstad ............... H04L 41/22 715/736 |

\* cited by examiner

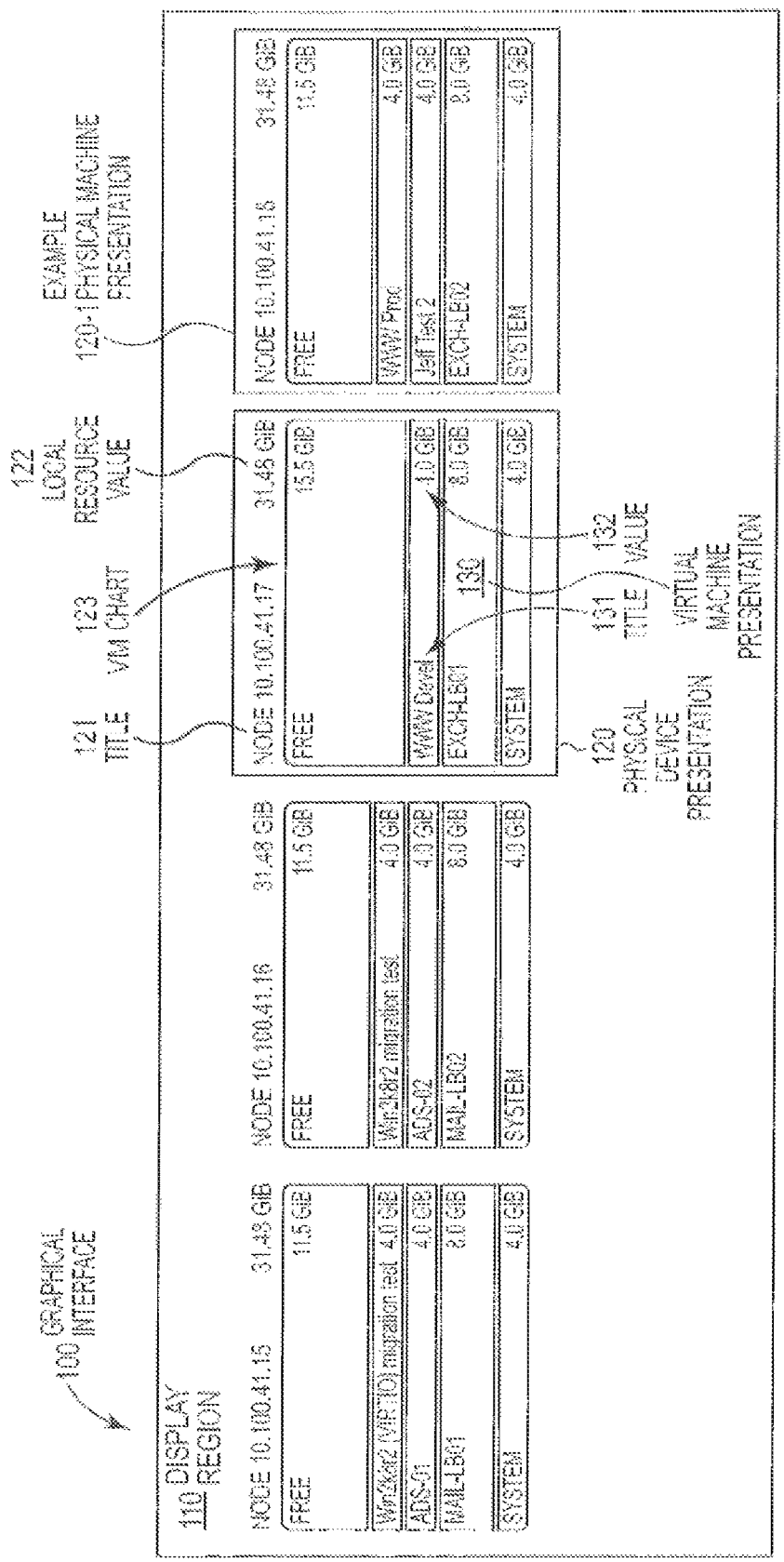

VIRTUAL MACHINE RESOURCE DISPLAY

CROSS-REFERENCE TO RELATED APPLICATIONS

Inventions described in this application can also be used in combination or conjunction, or otherwise, with techniques described in one or more of the following documents.

U.S. Provisional Patent Application 61/651,391, filed May 24, 2012, titled "Unified hypervisor and distributed fault-tolerant storage";

U.S. Provisional Patent Application 61/692,662, filed Aug. 23, 2012, titled "Transferring virtual machines and resource localization in a distributed fault-tolerant system"; and U.S. Provisional Patent Application 61/692,666, filed Aug. 23, 2012, titled "Virtual machine automated selection".

Each and every one of these documents is hereby incorporated by reference as if fully set forth herein. These documents are sometimes referred to herein as the "Incorporated Disclosures".

BACKGROUND

Field of the Disclosure

This application generally relates to virtual machine resource display, and related matters.

Background of the Disclosure

Many enterprises centralize their information technology operations in data centers, which perform computing operations and maintain storage on behalf of the enterprise's personnel. In those data centers, application servers often perform computing operations, each of which is often executed within its own virtual machine (VM). Each virtual machine can include an emulation of a physical machine, which can be executed by a physical computing device. Storage requirements are often provided by storage servers, which maintain blocks of storage that can be accessed by application servers and other devices using a network storage protocol.

It sometimes occurs that it is desirable to execute more than one virtual machine on a physical computing device. For example, in a data center as described above, a physical computing device can provide a service, which remote users can call upon, in which that physical computing device executes one or more virtual machines as requested. In such cases, the physical computing device provides physical resources, and allocates them to a specific virtual machine. When allocating the physical resources of the physical device to the virtual machines, it sometimes occurs that the physical resources available to that physical device limit the number and size of the virtual machines that the physical device can execute. For example, it sometimes occurs that a physical device having 32 GiB of memory cannot execute more than four virtual machines, each requiring 8 GiB of memory.

It sometimes occurs that multiple physical machines are disposed in a cluster, in which those multiple physical machines can intercommunicate. In such cases, one or more virtual machines, when allocated to physical devices, can have the effect of overloading those physical devices with respect to other physical devices. This can have the effect of causing those overloaded physical devices to run more slowly than necessary, while more lightly loaded physical devices run more quickly and could take up some of that load. This can pose a problem when an operator is assigning virtual machines to physical devices, as that operator does not have a relatively convenient way of determining which ones of those physical devices are overloaded with respect to other physical devices in the cluster.

It sometimes occurs that when an operator reviews the use of resources by physical devices in the cluster, it would be convenient for that operator to have a relatively easy way to view the resources used by virtual machines. Similarly, when an operator reviews the use of resources by physical devices in the cluster, it would be convenient for that operator to have a relatively easy way to view which physical devices are loaded or overloaded in that cluster. Similarly, this can pose a problem when an operator is reviewing the assignment of virtual machine physical devices, at that operator does not have a relatively convenient way of determining which physical devices are overloaded with respect to other physical devices in the cluster.

Each of these examples, as well as other possible considerations, can cause difficulty in use multiple physical machines are disposed in a cluster. For example, the operator of a cluster should take care that virtual machines are not assigned so that one or more of the physical devices are overloaded. Moreover, the operator of a cluster should take care that use of resources by virtual machines assigned to physical devices are relatively well balanced with respect to each other. Each of these might have a detrimental effect on the value of the cluster of physical devices and on assignment of virtual machines to those physical devices.

BRIEF SUMMARY OF THE DISCLOSURE

This application provides techniques for presenting information to operators of a cluster of physical devices, with respect to resources being used by physical machines assigned to physical devices in those clusters.

In one embodiment, an operator console is coupled to the cluster of physical devices, and receives information from those physical devices with respect to use of resources by virtual machines assigned to those physical devices. For example, each physical device can report a set of virtual machines assigned thereto, and an amount of physical memory assigned to each of those virtual machines. The operator console presents information to the operator regarding use of resources by virtual machines, in a natural and visible way that allows the operator to assess, relatively rapidly, use of resources by virtual machines assigned to those physical devices.

In one embodiment, the physical devices are disposed in an array including at least a first dimension indicating a selected device, and with each device associated with at least a second dimension indicating an amount of allocated resources. For example, the first dimension can include a horizontal axis, in which each selected device is separately represented on that axis.

In one embodiment, the virtual machines are disposed in an array including at least the second dimension indicating each virtual machine, and with each virtual machine occupying an amount of that second dimension in response to its allocated resources. For example, the second dimension can include a vertical axis, in which each virtual machine is separately represented on the axis. In such cases, each virtual machine can include a height which is proportional to its allocated resources.

In combination, the representation of physical devices in virtual machines shows the operator, in a natural and visible way, which of the physical devices are relatively overloaded with respect to which others. For example, in combination, the representation can show which physical devices have a large number of virtual machines, or which physical devices have a total amount of allocated resources that exceed that of other physical devices.

The representation of physical devices in virtual machines also presents a graphical interface by which the operator can, in a natural and visible way, allocate or reallocate virtual machines to physical devices, and allocate or reallocate resources to virtual machines. For example, in combination, the representation can present a graphical interface by which the operator can move virtual machines between physical devices, or adjust the amount of resources allocated to virtual machines.

After reading this application, those skilled in the art would recognize that techniques shown in this application are applicable to fields and information other than those fields specifically described herein. In the context of the invention, there is no particular requirement for any such limitation.

Moreover, after reading this application, those skilled in the art would recognize that techniques shown in this application are applicable to methods and systems other than those involving portable operating environments. In the context of the invention, there is no particular requirement for any such limitation. For example, other contexts can include frequent or important access to secured data, such as data that is otherwise hardware-protected, software-protected, or protected by use of a proprietary data format.

After reading this application, which shows and describes illustrative embodiments of the disclosure, other and further embodiments of the present disclosure will become apparent to those skilled in the art. As will be realized, the various embodiments of the present disclosure are capable of modifications in various obvious aspects, all without departing from the scope and spirit of the present disclosure. The drawings and detailed description are intended to be illustrative in nature and not restrictive in any way.

BRIEF DESCRIPTION OF THE FIGURES

FIG. 1 shows a conceptual drawing of a graphical interface.

DETAILED DESCRIPTION

Example Graphical Interface

FIG. 1 shows a conceptual drawing of a graphical interface.

In one embodiment, a graphical interface 100 can include a presentation of a display region 110, one or more selected physical device presentations 120 (each having an associated physical device), each showing one or more virtual machine presentations 130 (each having an associated virtual machine).

Physical Device Presentations.

In one embodiment, each physical device presentation 120 includes a separate presentation region, including a title 121, a local resource value 122, a virtual machine chart 123, and possibly other elements.

While this application primarily describes a system that assigns each physical device presentation 120 a separate presentation region, in the context of the invention, there is no particular requirement for any such limitation. For example, in some cases, more than one physical device presentation 120 can be combined into a collective presentation region. In a first such case, this might occur if there are a relatively large number of physical devices for which physical device presentations 120 are needed. In a second such case, this might occur if the physical devices had heterogeneous characteristics, and it is desirable to combine physical device presentations 120 for those physical devices having similar characteristics.

In one embodiment, the title 121 includes a character string naming the physical device associated with the physical device presentation 120, such as an IP address. However, in the context of the invention, there is no particular requirement for any such limitation. For example, the title 121 can include any other name for, or other character string associated with, the physical device associated with the physical device presentation 120. While the FIGURE shows each physical device presentation 120 with a unique title 121, in the context of the invention, there is no particular requirement for any such limitation. For example, more than one physical device presentation 120 can have similar or identical names (in response to the possibility that more than one physical device can have similar or identical names).

In one embodiment, the local resource value 122 is responsive to a total amount of local resources. However, in the context of the invention, there is no particular requirement for any such limitation. For example, the local resource value 122 can include an amount of local resources currently in use, an amount of local resources remaining, or some other value.

In one embodiment, the local resource value 122 includes a value responsive to a single resource, such as an amount of memory, an amount of network bandwidth, an amount of processor usage, or otherwise. However, in the context of the invention, there is no particular requirement for any such limitation.

For a first example, the local resource value 122 can include a fraction of that resource that is free, or that is in use.

For a second example, the local resource value 122 can include a maximum or minimum, or other statistical value, with respect to allocation or usage of a particular resource.

For a third example, the local resource value 122 can include a value responsive to a formula with respect to allocation or usage of more than one resource. In one such case, a formula can be a static formula set by a designer, an operator, or a user. In another such case, a formula can be a dynamic formula responsive to usage, responsive to machine learning, or otherwise.

In one embodiment, the virtual machine chart 123 includes a region such as a rectilinear shape, which shows assignments of virtual machines to physical devices. In alternative embodiments, the virtual machine chart 123 can have a different shape, such as a pie chart, and need not have the same shape (or size) for each physical device presentation 120. For example, in one alternative embodiment, each physical device presentation 120 can include a virtual machine chart 123 size is responsive to an amount of allocable resources available to the physical device associated with that physical device presentation 120. In one such case, two physical device presentations 120 with differing allocable resources would be presented with virtual machine chart 123 with differing sizes.

In one embodiment, the virtual machine chart 123 includes one or more virtual machine presentations 130, each one showing information about an associated virtual machine. For example, the virtual machine chart 123 for an example physical device presentation 120-1 can include a virtual machine presentation 130 for a first virtual machine titled "SYSTEM", a second virtual machine titled "EXCH-LB02", a third virtual machine titled "Jeff Test 2", a fourth virtual machine titled "WWW Prod", and a reserved space for unallocated resources (titled "FREE").

In one embodiment, the virtual machine presentations 130 can include, in addition to text, other information indicating the nature of the associated virtual machine, or of the resource use associated with that virtual machine. For example, the virtual machine presentations 130 can include color, highlighting, texture, or other aspects capable of being sensed by one or more operators (such as blinking, boldface text, italic text, or otherwise).

In one such case, a virtual machine presentation 130 for a virtual machine designated to operate the physical device (such as titled "SYSTEM") can include striping or another indicator to show that its associated virtual machine cannot readily be removed or reduced in size.

In another such case, a virtual machine presentation 130 for the reserved space for unallocated resources (such as titled "FREE") can include a blank color or another indicator to show that there is no such associated virtual machine and that the associated resources are so far unallocated.

In one embodiment, the virtual machine presentations 130 can be separated by a line or other indicator, to make reading the virtual machine chart 123 more convenient, to make selection of one or more virtual machine presentations 130 more readily convenient, or otherwise.

Virtual Machine Presentations.

In one embodiment, each virtual machine presentation 130 includes a title 131 and a virtual machine resource value 132, and possibly other elements.

Similar to the title 121 associated with the physical device presentation 120, the title 131 includes a character string naming the virtual machine associated with the virtual machine presentation 130. As described above, some character strings can be reserved as a special indicators, such as the terms "SYSTEM" and "FREE".

Similar to the local resource value 122 associated with the physical device presentation 120, the virtual machine resource value 132 includes a value responsive to a single resource, such as an amount of memory, an amount of network bandwidth, an amount of processor usage, or otherwise. For example, the virtual machine resource value 132 can include a value similar to any of the values described above with respect to the local resource value 122.

Interaction with Interface.

In one embodiment, the operator can interact with the graphical interface 100, such as by selecting one or more physical device presentations 120, one or more virtual machine presentations 130, or otherwise. For example, the operator can select one or more physical device presentations 120 to indicate selection of associated physical devices, can select one or more virtual machine presentations 130 can indicate selection of associated virtual machines (or free space), or can select some other element.

In one embodiment, the operator can direct the cluster to add or remove one or more physical devices. In response thereto, the graphical interface 100 adds or removes associated physical device presentations 120. For a first example, the operator can select one or more physical device presentations 120, and direct the graphical interface 100 to remove the associated physical devices. For a second example, the operator can select one or more physical device presentations 120, and direct the cluster to resize the associated physical devices, such as by adjusting a size of those physical device presentations 120. Thereafter, the cluster would treat those associated physical devices as having new sizes, as specified by the operator.

In one embodiment, the operator can direct the cluster to add or remove one or more virtual machines to selected physical devices. In response thereto, the graphical interface 100 adds or removes associated virtual machine presentations 130. For a first example, the operator can select one or more virtual machine presentations 130, and direct the graphical interface 100 to remove the associated virtual machines from their physical devices. For a second example, the operator can select one or more virtual machine presentations 130, and direct the graphical interface 100 to resize the associated virtual machines, such as by adjusting a border between two virtual machine presentations 130, or between a virtual machine presentation 130 and free space. Thereafter, the cluster would treat those associated virtual machines as having new sizes, as specified by the operator, and would adjust an amount of free space available on their physical devices (and adjust their physical device presentations 120).

In one embodiment, the operator can direct the cluster to move or copy one or more virtual machines between selected physical devices. In response thereto, the graphical interface too moves associated virtual machine presentations 130 between selected physical device presentations 120. For a first example, the operator can select one or more virtual machine presentations 130, and drag those virtual machine presentations 130 between selected physical device presentations 120. Thereafter, the cluster would remove those associated virtual machines from the source physical devices, restart them on the destination physical devices, as specified by the operator, and would adjust an amount of free space available on the source and destination physical devices (and adjust their physical device presentations 120).

In one embodiment, the operator can direct the cluster to rebalance load between selected physical devices, such as with respect to selected virtual machines. In response thereto, the graphical interface 100 computes a rebalanced loading of those physical devices with those virtual machines. Having done so, the cluster removes those associated virtual machines from the computed source physical devices, restarts them on the computed destination physical devices, as determined by the rebalanced loading, and would adjust the amount of free space available on the source and destination physical devices (and adjust their physical device presentations 120).

In one embodiment, the operator can direct the cluster to perform one or more such operations multiple times, such as by selecting multiple physical device presentations 120 or multiple virtual machine presentations 130.

For a first example, the operator can concurrently adjust the size of multiple physical devices. Similarly, the operator can concurrently remove multiple physical devices, or add multiple copies of a new physical device.

For a second example, the operator can concurrently adjust the size of multiple virtual machines. Similarly, the operator can concurrently remove multiple virtual machines, or add multiple copies of a new virtual machine.

For a third example, the operator can concurrently move multiple virtual machines between physical devices.

For a fourth example, the operator can concurrently copy virtual machines from one or more source physical devices to multiple destination physical places. This can have the effect of selecting one or more virtual machines, and making multiple copies thereof at selected destination physical devices.

After reading this application, the those skilled in the art will recognize that many other such examples are possible, are within the scope and spirit of the invention, and would be workable, without any requirement for new invention or further experiment.

Alternative Embodiments

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

The invention claimed is:

1. A method, including steps of:
providing an improved user interface for controlling a cluster of intercommunicating physical devices, including
from said cluster of intercommunicating physical devices, receiving information from a plurality of said physical devices, said information indicating distinct use of physical resources by each of one or more virtual machines assigned to differing ones of each of said physical devices;
presenting a graphic representation of said information to an operator associated with said cluster;
wherein said graphic representation includes a unified presentation having at least two dimensions, a first dimension including first and second selected devices in said cluster and a second dimension including a chart of all such virtual machines allocated to the first selected device and the second selected device;
wherein said chart includes each virtual machine allocated to the first selected device occupying a first amount of space proportional to an amount of physical resources allocated to each virtual machine;
wherein each virtual machine has a first linear measure and a second linear measure, said first and second linear measures being perpendicular, and said virtual machines allocated to the first selected device being displayed in a line along said second linear measure;
interacting with the operator, including receiving from the operator graphical commands applied to elements of the unified graphical representation, interpreting the operator graphical commands as operations to be performed with respect to physical devices or physical resources allocated to the one or more virtual machines of the cluster, and adjusting the graphic representation to conform to results of performing the graphical commands; and
wherein resizing one or more virtual machines is performed by adjusting a graphical interface border between two virtual machines thereby executing the operator graphical command to adjust the amount of physical resources allocated to the one or more virtual machines.

2. A method as in claim 1, wherein
said amount of resources allocated to each virtual machine is responsive to one or more of:
an amount of memory allocated to said virtual machine;
an amount of memory in use by to said virtual machine;
an amount of processing power allocated to said virtual machine;
an amount of processing power in use by said virtual machine;
an amount of network bandwidth allocated to said virtual machine;
an amount of network bandwidth in use by said virtual machine.

3. A method as in claim 1, wherein
each said physical device is allocated an amount of display space in response to an amount of resources it has available for virtual machines.

4. A method as in claim 1, wherein
each said physical device is allocated an amount of display space in response to the amount of resources it has available free for other use.

5. A method as in claim 1, wherein
at least one virtual machine allocated to the first selected device represents one SYSTEM virtual machine for each said physical device, said SYSTEM virtual machine being disposed at an end of said second linear measure, and along said second linear measure,
said SYSTEM virtual machine being represented with a unique indicator showing that it cannot be removed or reduced in resource consumption.

6. A method as in claim 1, including steps of
receiving, at the cluster of intercommunicating physical devices, instructions from an operator, wherein the instructions indicate a first device in the cluster from which to move a particular virtual machine and a second device in the cluster to which to move the particular virtual machine; and
moving the particular virtual machine from the first device in the cluster to the second device in the cluster.

7. A method as in claim 1, including steps of
receiving, at the cluster of intercommunicating physical devices, instructions from an operator, wherein the instructions indicate a first device in the cluster at which to create a particular virtual machine; and creating the particular virtual machine at the first device in the cluster.

8. A method as in claim 1, wherein moving or copying one or more virtual machines is performed by dragging and dropping a graphical interface presentation of the one or more virtual machines.

9. A method as in claim 1, wherein the physical devices in the cluster each include one or more processors, the physical devices intercommunicating at least in part by sharing memory or mass storage.

10. A method as in claim 1, wherein moving or copying one or more virtual machines is performed by dragging and dropping a graphical interface presentation of the one or more virtual machines.

11. A method as in claim 1, wherein the physical devices in the cluster each include one or more processors, the physical devices intercommunicating at least in part by sharing memory or mass storage.

12. Apparatus including:

an improved user interface for controlling a cluster of intercommunicating physical devices, including said cluster of intercommunicating physical devices, said physical devices exchanging information indicating use of resources by virtual machines assigned to each of said physical devices;

a presentation device receiving information from a plurality of ones of said cluster of intercommunicating physical devices, said information indicating distinct use of physical resources by each of one or more virtual machines assigned to differing ones of each of said physical devices;

said presentation device capable of presenting, in a unified graphical representation, at least two dimensions of information, said two dimensions including a first dimension describing each particular one of said plurality of devices and a second dimension describing each particular virtual machine allocated to said one of said plurality of devices;

wherein said second dimension includes each particular virtual machine occupying a first amount of space proportional to an amount of physical resources allocated to each virtual machine;

wherein each particular virtual machine has a first linear measure and a second linear measure, said first and second linear measures being perpendicular, and said virtual machines allocated to the same particular device being displayed in a line along said second linear measure;

wherein the cluster interacts with an operator, including receiving from the operator graphical commands applied to elements of the unified graphical representation, interpreting the operator graphical commands as operations to be performed with respect to physical devices or physical resources allocated to the one or more virtual machines of the cluster, and adjusting the graphic representation to conform to results of performing the graphical commands; and wherein resizing one or more virtual machines is performed by adjusting a graphical interface border between two virtual machines thereby executing the operator graphical command to adjust the amount of physical resources allocated to the one or more virtual machines.

13. Apparatus as in claim 12, wherein said amount of resources allocated to each virtual machine is response to one or more of:

an amount of memory allocated to said virtual machine;

an amount of memory in use by to said virtual machine;

an amount of processing power allocated to said virtual machine;

an amount of processing power in use by said virtual machine;

an amount of network bandwidth allocated to said virtual machine;

an amount of network bandwidth in use by said virtual machine.

14. Apparatus as in claim 12, wherein each said physical device is allocated an amount of display space in response to an amount of resources it has available for virtual machines.

15. Apparatus as in claim 12, wherein each said physical device is allocated an amount of display space in response to the amount of resources it has available free for other use.

16. Apparatus as in claim 12, wherein at least one virtual machine allocated to the first selected device represents one SYSTEM virtual machine for each said physical device, said SYSTEM virtual machine being disposed at an end of said second linear measure, and along said second linear measure, said SYSTEM virtual machine being represented with a unique indicator showing that it cannot be removed or reduced in resource consumption.

17. Apparatus as in claim 12, wherein at least one area for a virtual machine represents a FREE space for each said physical device, said FREE space being disposed at an end of said second linear measure, and along said second linear measure.

18. Apparatus as in claim 12, wherein said presentation device is capable of receiving, at the cluster of intercommunicating physical devices, instructions from an operator, wherein the instructions indicate a first device in the cluster from which to move a particular virtual machine and a second device in the cluster to which to move the particular virtual machine; and said cluster is capable of moving the selected virtual machine from the first device in the cluster to the second device in the cluster.

19. Apparatus as in claim 12, wherein said presentation device is capable of receiving, at the cluster of intercommunicating physical devices, instructions from an operator, wherein the instructions indicate a first device in the cluster at which to create a particular virtual machine; and said cluster is capable of creating the selected virtual machine at the first device in the cluster.

20. Apparatus as in claim 12, wherein the operator is able to determine, directly from the graphic representation, whether moving or copying one or more virtual machines to a physical device is performable by the cluster.

* * * * *